UNITED STATES PATENT OFFICE.

FRITZ WESTPHAL, OF REHHORST, NEAR REINFELD, GERMANY.

ARTIFICIAL GOOSE-GREASE AND PROCESS OF MAKING SAME.

1,031,218.   Specification of Letters Patent.   Patented July 2, 1912.

No Drawing.   Application filed December 16, 1911.  Serial No. 666,133.

*To all whom it may concern:*

Be it known that I, FRITZ WESTPHAL, subject of the Emperor of Germany, residing at Rehhorst, near Reinfeld, Holstein, Germany, have invented certain new and useful Improvements in Artificial Goose-Grease and Processes of Making Same, of which the following is a specification.

This invention relates to the art of producing artificial grease that has not only the taste and particular smell of goose-grease, but moreover possesses its granulousness and similar appearance.

The invention consists of the mixing of artificial butter with several harmless substances, whereby the desired effect is obtained.

The artificial butter in the trade which is nowadays furnished at rather low prices can well be considered as an excellent substitute for natural butter. But there is a justified demand not only for a substitute for natural butter, but also for other cheap artificial lard substitutes, which may be applied in a like manner as soon as such substitute has been fully acknowledged from a physical point of view.

The artificial butter used in this process is that which is prepared and brought on the market in the customary manner. Experience and the experiments have shown that, if hog-lard, onions and pimento-grains are added a material is produced which, in taste and smell, is fully equivalent to goose-grease and moreover, even has its appearance, the required softness and its grain. The quantity of hog-lard which is to be mixed with the artificial butter varies according to the quality of the butter and its composition. The following proportions may serve as an example for the process of production: 2 parts artificial butter, 1 part hog-lard, 1/10 part onions, 1/100 part pimento-grains. Both greasy substances are melted and, as soon as they are liquefied, are mixed with each other and the crushed onions and pimento-grains added. After this mixture has been boiled it is clarified, whereupon the product is ready for use. To this may be added a few parts of natural goose-grease, which however is not absolutely necessary.

The grease produced by this process keeps for a long time, and can be considered as a surrogate fully equivalent to natural goose-grease, and be applied as such.

Having thus fully described my invention, what I claim is—

1. The process of making artificial goose-grease which consists in combining about 2 parts of artificial butter, about 1 part hog-lard, about 1/10 part of onions and about 1/100 part of pimento-grains, by heating and then clarifying the mixture.

2. Artificial goose-grease composed of about 2 parts of artificial butter, about 1 part of hog-lard, about 1/10 part of onions, and about 1/100 part of pimento-grains.

In testimony whereof I affix my signature in the presence of two witnesses.

FRITZ WESTPHAL.

Witnesses:
 WM. ALFRED,
 JOHN WULF.